United States Patent
Chan

[19]

[11] Patent Number: 6,019,029
[45] Date of Patent: Feb. 1, 2000

[54] PRESSURE COOKER

[75] Inventor: Wing Po Chan, Hong Kong, The Hong Kong Special Administrative Region of the People's Republic of China

[73] Assignee: Chiaphua Industries Limited, The Hong Kong Special Administrative Region of the People's Republic of China

[21] Appl. No.: 09/391,913

[22] Filed: Sep. 9, 1999

[51] Int. Cl.[7] .............................. A47J 27/00; A47J 27/06; A47J 27/092; A47J 27/21; F16K 17/02

[52] U.S. Cl. ................... 99/337; 99/330; 99/403; 220/314; 220/316; 220/393; 220/912

[58] Field of Search ............................. 99/330–331, 337, 99/338, 340, 339, 342, 403–418; 126/369, 377, 378, 373, 374, 388, 389; 220/314, 316, 393, 319, 324, 325, 912, 287; 292/256; D7/391, 538

[56] References Cited

U.S. PATENT DOCUMENTS

| | | | |
|---|---|---|---|
| 2,549,387 | 4/1951 | Richeson | 220/316 |
| 4,024,982 | 5/1977 | Schultz | 220/293 |
| 4,135,640 | 1/1979 | MacQuilkin et al. | 220/316 |
| 4,161,260 | 7/1979 | Lagostina | 220/319 |
| 4,162,741 | 7/1979 | Walker et al. | 220/203 |
| 4,574,988 | 3/1986 | Karliner | 220/316 |
| 4,711,366 | 12/1987 | Chen | 99/337 |
| 4,733,795 | 3/1988 | Boehm | 220/316 |
| 4,796,776 | 1/1989 | Dalquist et al. | 220/203 |
| 4,932,550 | 6/1990 | Moucha | 99/403 |
| 5,048,400 | 9/1991 | Ueda et al. | 99/403 |
| 5,370,257 | 12/1994 | Chameroy et al. | 220/293 X |
| 5,678,721 | 10/1997 | Cartigny et al. | 99/337 X |

*Primary Examiner*—Timothy Simone
*Attorney, Agent, or Firm*—Jackson Walker L.L.P.

[57] ABSTRACT

A lid for a pressure cooker has two radially slidable jaws with upstanding lips, respectively. A locking plate can slide transversely outwards from the position shown so that the lips ride along limbs of apertures and are thereafter held, to prevent radial movement, by the plate. The plate is held in its transverse outward position by a plunger (not shown) of a locking valve that is engaged in an aperture in the plate. The plunger is released to fall from an uplifted locking position when pressure in the cooker falls below a predetermined level and to enable the plunger to become slidable along the aperture. This allows the plate to move and unlock the jaws so that the lid can be removed.

5 Claims, 3 Drawing Sheets

PRESSURE COOKER

BACKGROUND OF THE INVENTION

1. Field of the Invention

The invention relates to pressure cookers.

2. Description of the Prior Art

The invention relates more particularly to a pressure cooker lid that remains securely locked in position whenever pressure inside the cooker is above a predetermined pressure. This prevents the lid being removed or becoming loose inadvertently until the inside pressure is below a safe level. Several proposals for locking cooker pressure lids are already known. For example, in U.S. Pat. No. 5,678,721 a lid is held closed by a locking valve that prevents release of radially slidable clamp jaws until pressure inside the cooker falls to a safe level. In U.S. Pat. No. 5,678,721 the locking valve may fail in its operation or its plunger may fail mechanically so that the jaws are then free to move and the lid to open.

SUMMARY OF THE INVENTION

It is an object of the invention to overcome this problem.

According to the invention there is provided a pressure cooker lid for a container having two aligned jaws slidingly and radially movable in opposite directions between locking positions and unlocking positions with respect to the container, each jaw having a mechanical abutment surface extending transverse to the radial direction, and a transverse jaws locking plate that removably fits in one position between the abutment surfaces to mechanically maintain a separation between such surfaces to prevent radial movement of each jaw from its locking position, in which a pressure operable locking valve is mounted to the lid and arranged to mechanically cooperate with the plate to prevent movement thereof from the one position whenever a pressure inside the container is exceeds a predetermined pressure.

The abutment surfaces may comprise upstanding lips integrally formed with the jaws.

A cage may be mounted centrally to the lid formed with respective rail sections for slidingly receiving both of the jaws and the locking plate.

The locking plate may be formed with L-shaped apertures that embrace the abutment surfaces so that in the locking positions each abutment surface is held radially stationary by one limb of the "L" and when the locking plate is moved the abutment surface may move along the other limb of a respective "L" to allow the jaw to move to its unlocking position.

The locking plate may have a central transversely extending elongate aperture to receive a plunger of the locking valve, the aperture being enlarged at one end to fit snugly around the plunger to prevent the locking plate moving transversely, and a neck portion provided in the plunger that is arranged to align vertically with aperture whenever pressure in the container is below said predetermined pressure to allow the locking plate to move transversely to unlock the jaws.

BRIEF DESCRIPTION OF THE DRAWINGS

A pressure cooker lid according to the invention will now be described by way of example with reference to the accompanying drawings in which.

DESCRIPTION OF THE PREFERRED EMBODIMENTS

Figure 1:
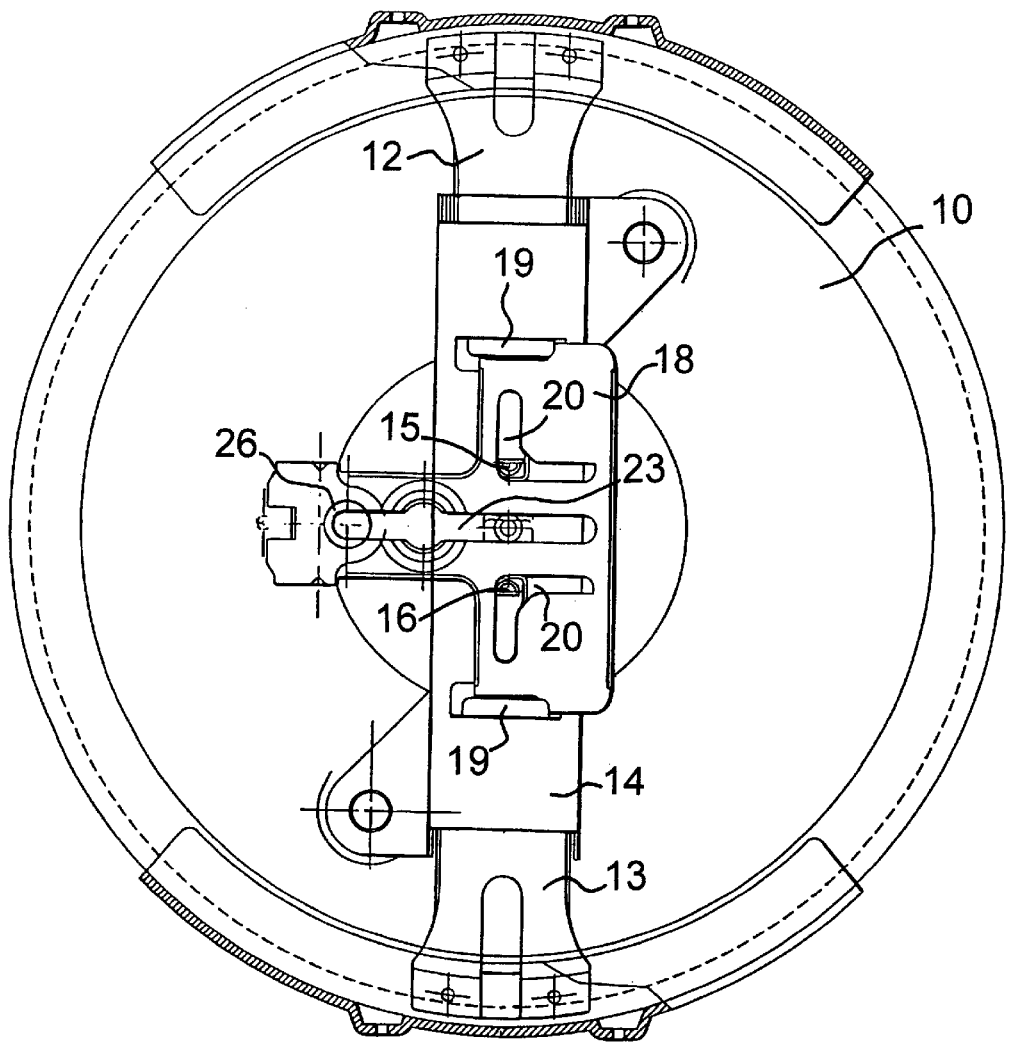
FIG. 1 is a part cut-away plan view of part of the lid.
Figure 2:
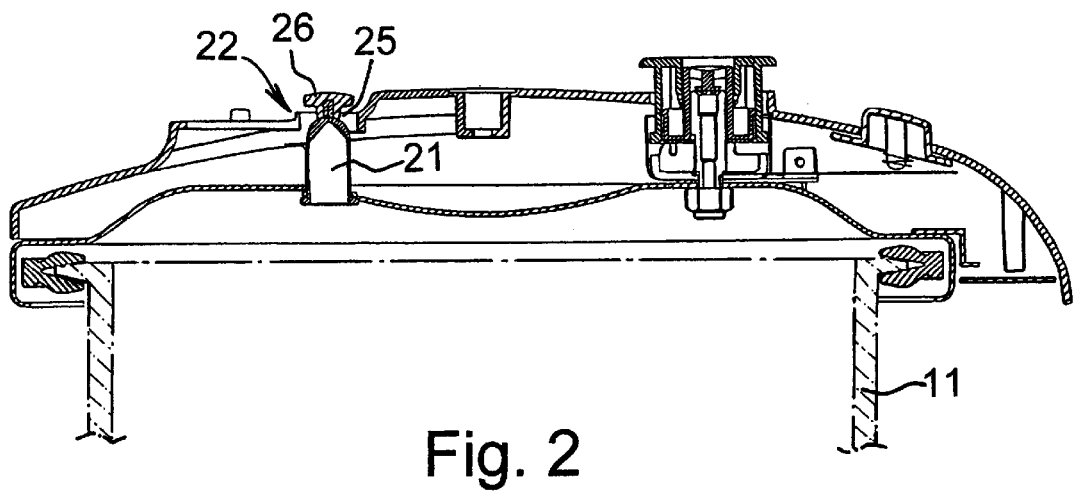
FIG. 2 is a sectional side view of the lid.

Referring to the drawings, a lid is of generally well-known form and has aligned two jaws (or jaw clamps) that slide radially in opposition to seal and to lock the lid to a cooking container. The lid can be unlocked and then completely lifted off the container for charging the container with food and for emptying cooked food out of the container. Conventional items shown in the drawings will therefore not be described in detail.

Figure 3:
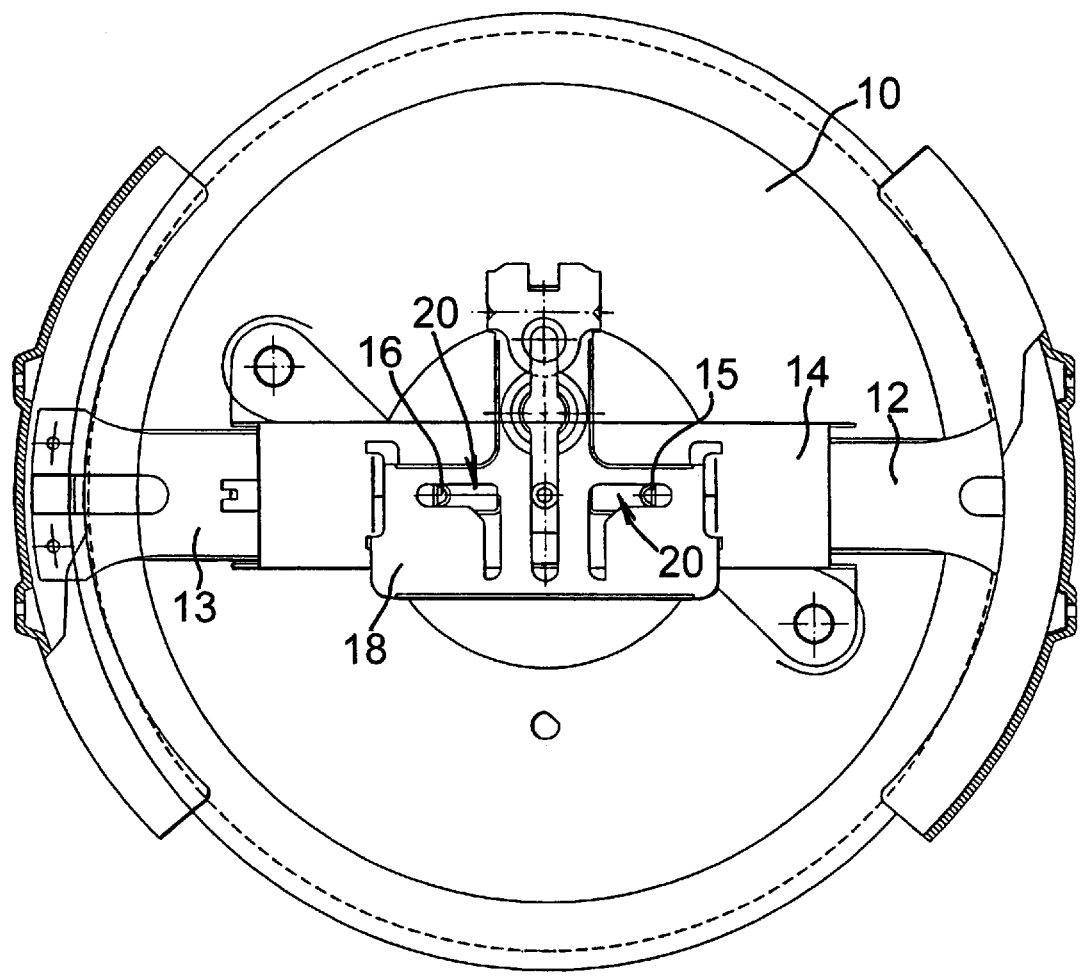
FIG. 3 is another plan view of part of the lid.
Figure 4:
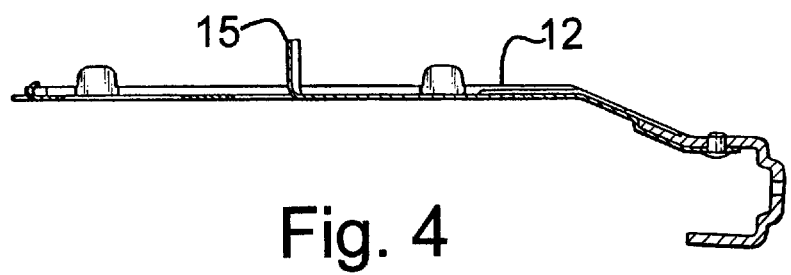
FIG. 4 is a side view of one jaw for the lid.
Figure 5:
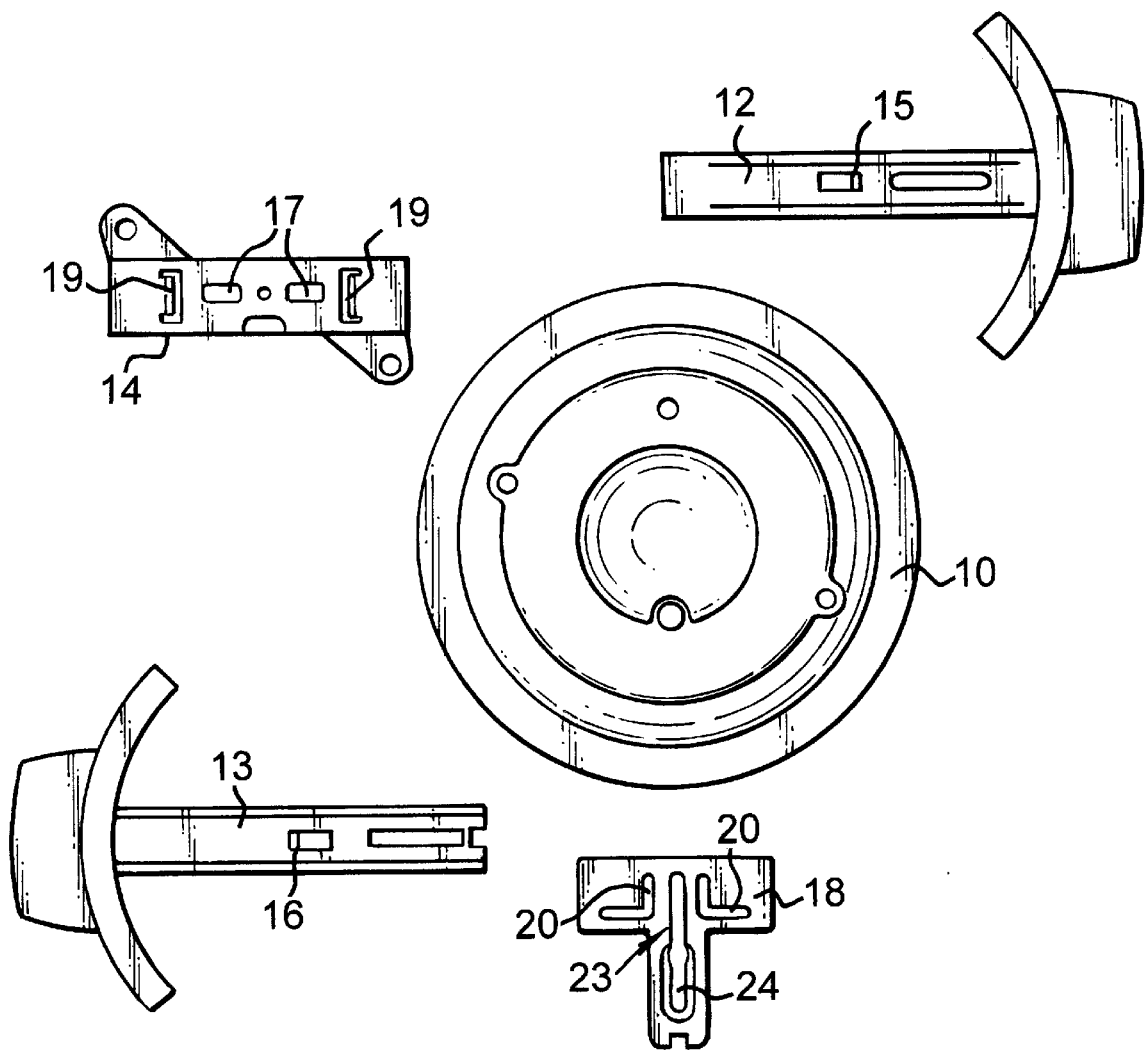
FIG. 5 shows a plan view of major components of the lid in dissembled array.

In the Figures, the lid 10 for a container 11 (partially shown with dash lines in FIG. 3) is provided with two slidable jaws 12 and 13 that can move between a locking position shown in FIG. 1 and an unlocking position shown in FIG. 3. The jaws are radially slidable inside a cage 14 that fits to the lid 10. The jaws have mechanical transverse mechanical abutments 15 and 16 comprising integrally formed upstanding lips. The lips fit through radially extending apertures 17 in the cage 14. The jaws 12 and 13 can therefore slide in the cage 14 as required and a transverse locking plate 18 slidingly fits between rails 19 provided on the cage 14.

The plate 18 has two apertures 20, each with two limbs to form an L-shaped, through which the lips 15 and 16 respectively extend so that in one position (FIG. 1) the plate 18 can be slid transversely to lock each of the jaws in its locking position. The locking plate 18 thereafter mechanically maintains a separation between the lips 15 and 16 to prevent radial outward movement of each jaw, or, in other words, to ensure that the jaws remain firmly and securely in their locking positions. It can be seen in FIG. 3 that when jaws are in their unlocking positions, the lips 15 and 16 are located at the respective ends of one of the limbs of the apertures 20. Thus, to lock the lid 10 to the container 11, the jaws are moved radially inwards to the positions shown in FIG. 1 and then the locking plate 18 is slid transversely so that the lips 15 and 16 enter along the other limbs of the apertures 20 to lock the lid 10 to the container 11.

It will be therefore apparent that such a secure locking arrangement is not dependent on the operation of pressure sensitive "locking valve" nor dependent on the mechanical strength or integrity of components of such a valve, as is the case in the prior art for example. The locking plate 18 is a relatively simple and robust component that acts on the lips 15 and 16 in a straight-forward manner to ensure that the jaws 12 and 13 remain, when required, in their locking positions. It will be noted that there are no forces acting on the plate 18 that will tend to move the plate transversely away from its locking position.

It will be appreciated that the locking plate 18 could be hinged, and not slidable, so that the plate is lifted and tilted out of the paths of the lips 15 and 16 to unlock the jaws. This allows the jaws 12 and 13 to then slide inwards from their locking positions to their unlocking positions when required.

In the Figures, the locking plate 18 is further secured in its locking position by a plunger 21 of a pressure operable valve 22. The plunger 21 fits through a transversely extending aperture 23 that is enlarged at one end 24. When the plunger is uplifted in use because the pressure in the container 11 is above a predetermined level, the plate 18 cannot be slid from its locked position (to the position shown in FIG. 1) and so that the jaws cannot be unlocked. When the pressure in the container is below the predetermined level, the plunger 21 is no longer uplifted and a neck 25 of the plunger is vertically aligned with the aperture 23 to allow the locking plate 18 to slide transversely. As the neck rides along the aperture, a cap 26 on the end of the plunger 21 prevents the plunger 21 falling away from the locking plate 18.

Thus, in normal use the jaws 12 and 13 are locked to the container 11 and whenever the pressure in the container is above the predetermined level, the locking plate 18 cannot be released from its locking position. The plunger 21 prevents the plate 18 being slid to a position where the lips 15 and 16 can move, along the apertures 20, relative to the locking plate 18. Also, should the locking valve 22 fail for any reason, there is no tendency for the plate 18 to inadvertently move from its locking position. Thus, the jaws 12 and 13 remain locked and remain mechanically held locked by the plate 21.

The plunger 21 is urged downwards by the plate 18 in its unlocked position to unseat a lower lipped end of the plunger from an undersurface of the lid 10. This allows enough leakage from the container to ensure in use no pressure can built up inside the cooker when the plate is not locked. Leakage of steam will also alert the user to the fact that the lid lock is not properly locked.

I claim:

1. A pressure cooker lid for a container having two aligned jaws slidingly and radially movable in opposite directions between locking positions and unlocking positions with respect to the container, each jaw having a mechanical abutment surface extending transverse to the radial direction, and a transverse jaws locking plate that removably fits in one position between the abutment surfaces to mechanically maintain a separation between such surfaces to prevent radial movement of each jaw from its locking position, in which a pressure operable locking valve is mounted to the lid and arranged to mechanically cooperate with the plate to prevent movement thereof from the one position whenever a pressure inside the container exceeds a predetermined pressure.

2. A pressure cooker lid according to claim 1, in which the abutment surfaces comprise upstanding lips integrally formed with the jaws.

3. A pressure cooker lid according to claim 1, including a cage that is mounted centrally to the lid formed with respective rail sections for slidingly receiving both of the jaws and the locking plate.

4. A pressure cooker lid according to claim 1, in which the locking plate is formed with L-shaped apertures that embrace the abutment surfaces so that in the locking positions each abutment surface is held radially stationary by one limb of the "L" and when the locking plate is moved the abutment surface may move along the other limb of a respective "L" to allow the jaw to move to its unlocking position.

5. A pressure cooker lid according to claim 1, in which the locking plate has a central transversely extending elongate aperture to receive a plunger of the locking valve, the aperture being enlarged at one end to fit snugly around the plunger to prevent the locking plate moving transversely, and a neck portion provided in the plunger that is arranged to align vertically with aperture whenever pressure in the container is below said predetermined pressure to allow the locking plate to move transversely to unlock the jaws.

* * * * *